(12) United States Patent
Hsiau et al.

(10) Patent No.: US 9,108,139 B2
(45) Date of Patent: Aug. 18, 2015

(54) GRANULAR BED FILTRATION SYSTEM WITH GAS ENTRAINED RECYCLING

(71) Applicant: NATIONAL CENTRAL UNIVERSITY, Taoyuan County (TW)

(72) Inventors: Shu-San Hsiau, Taoyuan County (TW); Bo-Jun Wang, Taoyuan County (TW); Chun-Chung Liao, Taoyuan County (TW); Yau-Pin Chyou, Taoyuan County (TW)

(73) Assignee: NATIONAL CENTRAL UNIVERSITY, Taoyuan County (TW)

( * ) Notice: Subject to any disclaimer, the term of this patent is extended or adjusted under 35 U.S.C. 154(b) by 295 days.

(21) Appl. No.: 13/803,312

(22) Filed: Mar. 14, 2013

(65) Prior Publication Data

US 2014/0216264 A1 Aug. 7, 2014

(30) Foreign Application Priority Data

Feb. 1, 2013 (TW) .............................. 102103942 U

(51) Int. Cl.
| | |
|---|---|
| *B01D 50/00* | (2006.01) |
| *B01D 46/34* | (2006.01) |
| *B01D 45/12* | (2006.01) |
| *B01D 45/16* | (2006.01) |
| *B01D 46/24* | (2006.01) |

(52) U.S. Cl.
CPC ............... *B01D 46/34* (2013.01); *B01D 45/12* (2013.01); *B01D 45/16* (2013.01); *B01D 46/2411* (2013.01); *B01D 50/002* (2013.01); *B01D 2257/504* (2013.01); *Y02C 10/08* (2013.01)

(58) Field of Classification Search
CPC ................. B01D 50/002; B01D 45/16; B01D 2257/504; B01D 46/2411; Y02C 10/08
USPC ................. 55/337, 459.1, 467, 356, 357, 474; 96/373, 130, 150; 95/107, 108, 110
See application file for complete search history.

(56) References Cited

U.S. PATENT DOCUMENTS

| | | | | |
|---|---|---|---|---|
| 3,512,340 | A * | 5/1970 | Friedrich et al. | 95/60 |
| 3,556,202 | A * | 1/1971 | Stockford et al. | 165/66 |
| 5,951,725 | A * | 9/1999 | Vross et al. | 55/356 |
| 7,132,088 | B2 * | 11/2006 | Smid et al. | 422/176 |
| 2005/0217225 | A1 * | 10/2005 | Peng et al. | 55/474 |
| 2012/0213675 | A1 * | 8/2012 | Chyou et al. | 422/177 |

FOREIGN PATENT DOCUMENTS

| | | |
|---|---|---|
| CN | 102580461 A | 7/2012 |
| TW | 200827016 A | 7/2008 |

* cited by examiner

*Primary Examiner* — Dung H Bui
(74) *Attorney, Agent, or Firm* — Li & Cai Intellectual Property (USA) Office

(57) ABSTRACT

The instant disclosure relates to a granular bed filtration system with gas entrained recycling for thermal power plants to filter dust from the exhaust gas. The granular bed filtration system comprises a flow channel, a gas intake, a gas exhaust portion, a granular sieving unit, a vacuum, a cyclone separator and a pneumatic transporting device. The flow channels guide filtering media to filter the inlet gas, and then the filtered gas is exhausted through the gas exhaust outside of the granular bed filtration system. The granular sieving unit separates the filtering media and dust. The vacuum, pneumatic transporting device and cyclone separator repeatedly deliver the filtering media by gas-entrainment recycle.

10 Claims, 8 Drawing Sheets

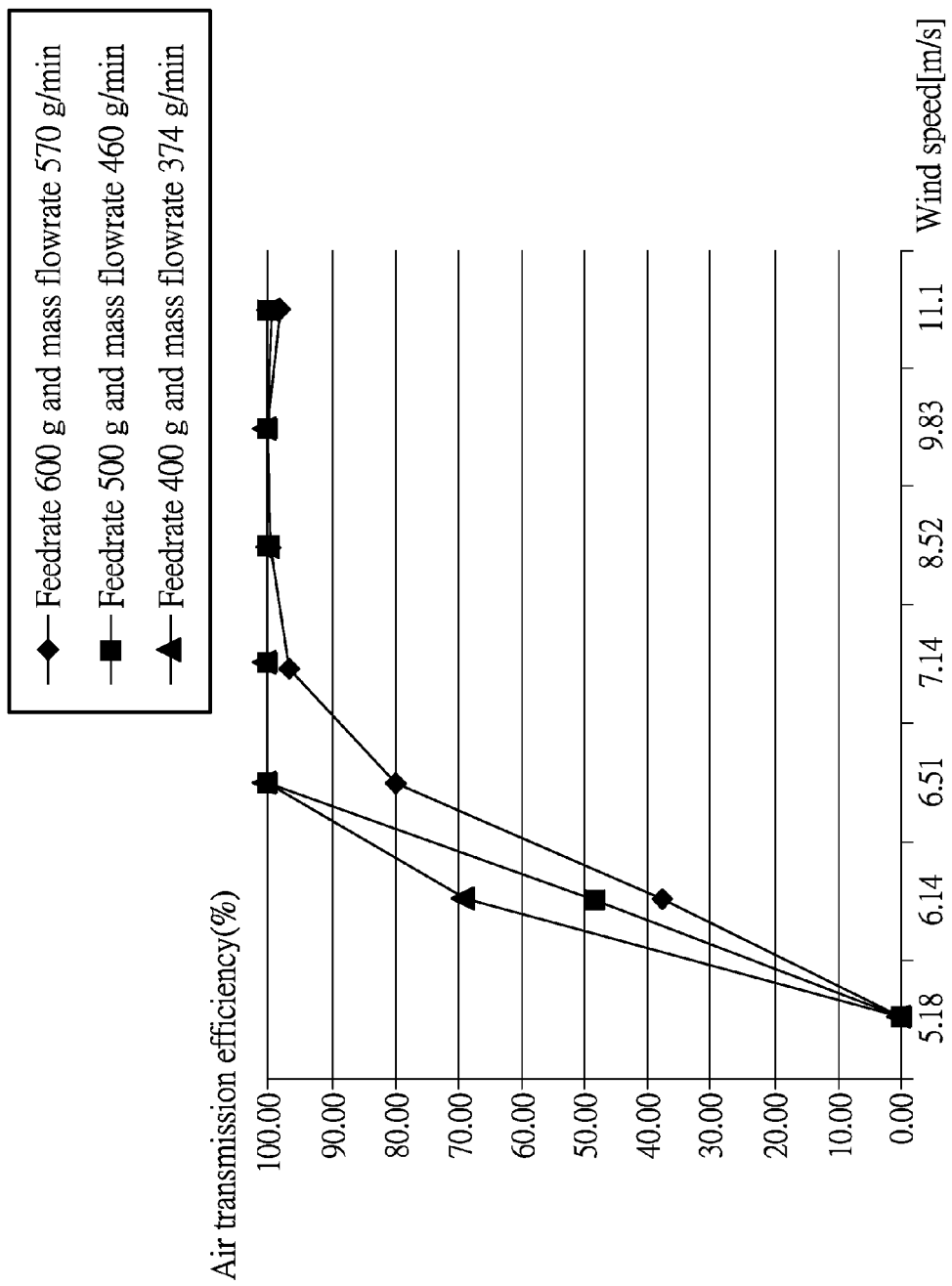

GRANULAR BED FILTRATION SYSTEM WITH GAS ENTRAINED RECYCLING

BACKGROUND OF THE INVENTION

1. Field of the Invention

The instant disclosure relates to a granular bed filtration; in particular, to a granular bed filtration system with gas entrained recycling for a thermal power plant using coal-fired power generation technology.

2. Description of Related Art

Once oil and natural gas are exhausted, coal may be left as one of the main sources of fuel for power plants in the future. Therefore, now is the time to begin researching and developing clean coal technology to enhance conversion efficiency as well as to achieve the objective of energy saving and carbon footprint reduction. Currently, the integrated gasification combined cycle (IGCC) is a coal-fired power generation technology that has developmental and applicable potential. Traditionally, IGCC uses various types of filtration devices to filter out dust that was generated by gasification in order to prevent gas or dust containing sulfur and phosphorus from polluting the environment, and protect downstream power generating equipment. Certainly, in a safe national energy stand point, IGCC has a diversified selection of feedstock (coal, biomass, petroleum coke, asphalt, and other domestic waste resources alike for developmental application) which can effectively minimize dependence on a single energy resource, and enhance energy alternatives as well as safety.

Generally, the raw syngas produced from IGCC contains a large amount of fly ash and pollutants. The high temperature, high pressure granular dust substances (such as fly ash) must be filtered out from the raw syngas in order to prevent the high temperature dust substances from depositing onto the blades of syngas turbines, which could be detrimental to the mechanical properties of the blades. Moreover, normal operation of the dynamic system is ensured and service life of turbines is extended. However, in structural design of the traditional IGCC system, filtering and sieving for granular dust substances are mainly through gravity settling chamber, cyclone collector, wet scrubber, electrostatic precipitator, ceramic filters, filter bag dust collectors, and related equipment. But in order to ensure the normal operation of the aforementioned dust removal or cleaning equipment, the high temperature high pressure raw syngas and the granular dust substances traditionally undergo temperature and pressure reduction, thus, resulting in low power efficiency and recontamination from waste water used for temperature reduction. Certainly, the cost investment of complex equipment used for temperature and pressure reduction is a relatively large obstacle for commercialization.

Therefore, the objective is to filter out the granular dust substances from the high temperature high pressure raw syngas without affecting the normal operations while maintaining cost and filtering efficiency.

To address the above issues, the inventor strives via associated experience and research to present the instant disclosure, which can effectively improve the limitation described above.

SUMMARY OF THE INVENTION

The object of the instant disclosure is to take into account of equipment cost and filtration efficiency while filtering out the toxic and harmful granular dust like substances from the high temperature, high pressure flue gases generated from thermal power plants.

In order to achieve the aforementioned objects, according to one embodiment of the instant disclosure, a granular bed filtration system with gas entrained recycling filters out dust or contaminants within the gases via a filtering medium (or media). The granular bed filtration system with gas entrained recycling includes a flow channel, a gas intake, a gas exhaust, a granular sieving unit, a vacuum, and cyclone separator, and a pneumatic transporting device. The flow channel includes a first inlet, a first outlet, and at least one gas inlet, and at least one gas outlet. The gas inlet and the gas outlet are respectively arranged on opposing sides of the flow channel. The gas intake is correspondingly arranged proximate to a side of the gas inlet to guide unfiltered gases to the gas inlet. The gas exhaust is correspondingly arranged proximate to a side of the gas outlet to guide filtered gas away from the gas outlet. The granular sieving unit is interconnected to the first outlet. The cyclone separator includes a second inlet, a second outlet, and an extraction port. The second inlet and the second outlet are arranged beneath the extraction port. The vacuum is interconnected to the extraction port. The second outlet is interconnected with the first inlet. The pneumatic transporting device is interconnected with the granular sieving unit and the second inlet for transporting the filtering medium to the cyclone separator. As a result, the filtering medium can continuously recycle within the granular bed filtration system with gas entrained recycling. As mentioned above, the granular bed filtration system with gas entrained recycling includes the gas intake which is sealed to the periphery of the gas inlet and the gas exhaust which is sealed to the periphery of the gas outlet. The extraction port is arranged on the top of the cyclone separator. The second outlet is arranged beneath the second inlet. The first inlet is arranged above the first outlet. The cyclone separator is arranged above the first inlet. The second outlet and the first inlet are selectively arranged with a filtering media transporting device therebetween such that filtering media transporting device can transports the filtering medium to the first inlet. The vacuum and the extraction port are arranged with a filtration unit therebetween. The vacuum has a wind speed no less than 6.51 m/s. The granular sieving unit and the pneumatic transporting device are selectively arranged with filtering media transporting device therebetween. The gases discharged from the vacuum are redirected to the pneumatic transporting device.

Hereby, the granular bed filtration system with gas entrained recycling of the instant disclosure can consistently provide recyclable and essentially automated filtering that separates granular filtering media from flue gas dust within the flue gases of thermal power plants and prevents piping blockage under high temperature high pressure conditions. Also, by controlling the parameters of the gas entrained recycling provided by the instant disclosure, gas (air) transmission efficiency may sustain at about 100% for a substantial period of time. The wind speed of the vacuum and the filtering media mass flowrate parameters can be adjusted according to the desired demand in order to control the dust filtering efficiency or sieving efficiency of the system while provide energy saving (at minimum wind speed suctioning), practicality, and substantial utility potential. The granular bed filtration system with gas entrained recycling also has a simple structure, as well as low equipment and filtering media cost while taking into account the cost and filtration efficiency of the system configuration.

In order to further understand the instant disclosure, the following embodiments and illustrations are provided. However, the detailed description and drawings are merely illustrative of the disclosure, rather than limiting the scope being defined by the appended claims and equivalents thereof.

BRIEF DESCRIPTION OF THE DRAWINGS

FIGS. 5 to 6 are diagrams illustrating the effect of wind speed on the granular bed filtration system with gas entrained recycling of the instant disclosure.

DETAILED DESCRIPTION OF THE PREFERRED EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

First Embodiment

Figure 1A:
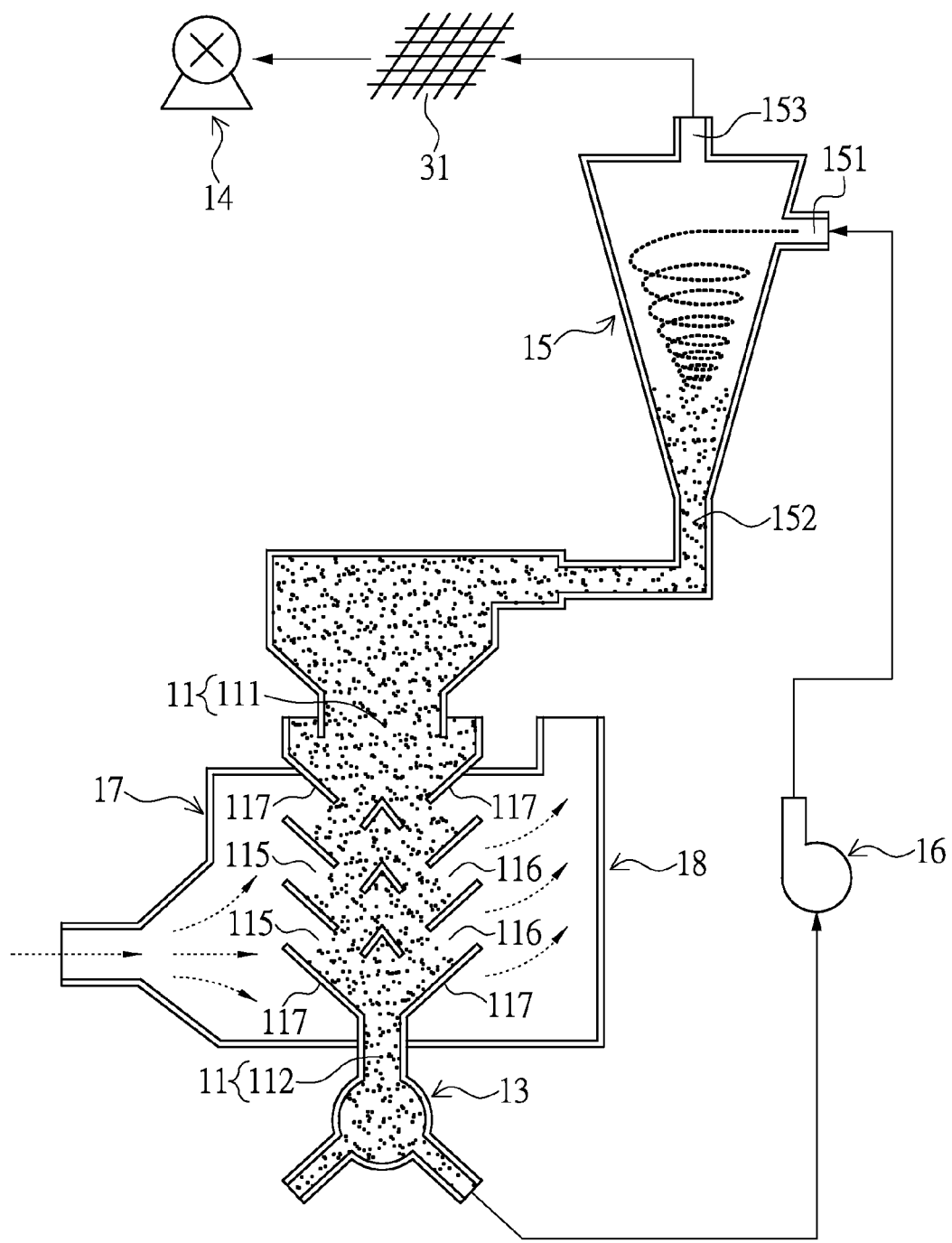
FIG. 1A is a schematic diagram illustrating the granular bed filtration system with gas entrained recycling according to a first embodiment of the instant disclosure.

As illustrated in FIG. 1A, the granular bed filtration system with gas entrained recycling 1 of the instant disclosure can be used for thermal power plants. Through the continuous circulation of granular filtering media (not labeled) in the system, the dust or pollutants in flue gas (part of the raw syngas) generated from thermal power plants are filtered out. The filtering media can be fine sand, gravel, or fine particulars mixed with catalysts and absorbents. Using fine gravel or similar particular matter as filtering media in the common water purification process has already been widely applied with relatively well-received results. Thus, the instant disclosure applies such filtering media, as gas purification not only provides relatively low pricing, resistance to high temperature, resistance to acid and alkali, robustness, convenient replaceability, relatively well dust removal capability, and relatively long service life, etc, but can also effectively remove impurities (dust) generated from thermal power plants in dry and high temperature high pressured (HTHP) conditions.

The granular bed filtration system with gas entrained recycling 1 includes a flow channel 11, a gas intake 17, a gas exhaust 18, a granular sieving unit 13, a vacuum 14, a cyclone separator 15, and a pneumatic transporting device 16. The flow channel 11 has a first inlet 111, a first outlet 112, at least one gas inlet 115, and at least one gas outlet 116. In the instant embodiment, the first inlet 111 is configured above the first outlet 112, and the granular bed filtration system with gas entrained recycling 1 includes a plurality of the gas inlets and outlets 115, 116 arranged therein, specifically, the gas inlets and outlets 115, 116 are arranged on two sides of with the first inlet 11. The gas intake 17 is correspondingly arranged proximate to a side of the gas inlet 115 while the gas exhaust 18 is correspondingly arranged proximate to a side of the gas outlet 116. Moreover, the cyclone separator 15 includes a second inlet 151, a second outlet 152, and an extraction port 153. The second inlet 151 and the second outlet 152 are arranged beneath the extraction port 153. The vacuum 14 is interconnected with the extraction port 153 of the cyclone separator 15, and the second outlet 152 of the cyclone separator 15 is interconnected with the first inlet 111 of the flow channel 11. In the instant embodiment, the cyclone separator 15 is arranged above the first inlet 111 of the flow channel 11 such that the filtering media in the cyclone separator 15 can flow downwards due to gravity and into the flow channel 11 through the first inlet 111. Furthermore, the vacuum 14 and the extraction port 153 of the cyclone separator 153 may also include a filtering unit 31 disposed therebetween to prevent fine dust from entering the vacuum 14 and damaging the internal components of the vacuum 14.

Each gas inlet 115 is defined by a plurality of baffles 117 configured with pre-determined intervals therebetween, thus, forming the inlet. Each baffle 117 is obliquely arranged such that the gas inlet 115 may have a corresponding flow path between the baffles 117. Similarly, each gas outlet 116 is defined by a plurality of baffles 117 configured with pre-determined intervals therebetween, thus forming the outlet. Each baffle 117 is obliquely arranged such that the gas outlet 116 may have a corresponding flow path between the baffles 117. In the preferred embodiment, the gas intake 17 is sealed proximate to the periphery of the gas inlet 115 and the gas exhaust 18 is sealed proximate to the periphery of the gas outlet 116 such that flue gases from thermal power plant may enter through the gas intake 17. Subsequently, flue gases may enter the flow channel 11 through the plurality of the gas inlets 115, successively leave the flow channel 11 through the plurality of the gas outlets 116, and depart from the gas exhaust 18 in order to exhaust filtered flue gases (FIG. 1A shows the embodiment with an upward exhaust direction). In other words, the gas intake 17 guides unfiltered gases to the gas inlet 115 and the gas exhaust 18 guides the filtered gases away from the gas outlet 116. As a result, the unfiltered flue gases can pass through the granular filtering media in the flow channel 11 and filter the dust (or other fine particular matters) in the unfiltered flue gases while maintaining the substantially high temperature in order to prevent gas or dust containing sulfur and phosphorus from polluting the environment. Thus, the downstream power generating equipment is protected. Generally, unfiltered flue gases from thermal power plants are filtered at sustained high temperature, which can be further processed for heat recovery (such as for subsequent cogeneration, combined heat and power, or other process needs) to increase energy efficiency.

Furthermore, filtering medium is an important component for filtering flue gases. In order to maintain the filtering efficiency of the filtering media, dust is prevented from accumulating inside the filtering media which leads to reduction or even stoppage to the flow of flue gases. The filtering media must maintain circulation flow and minimize dust accumulation on the surface thereof such that the filtering media can be repeatedly and continuously recycled. Hence, the granular bed filtration system with gas entrained recycling 1 can form a "fluidized" state by guiding the filtering media to enter the flow channel 11 from the first inlet 111, through the plurality of baffles 117, and slowly flow down to the first outlet 112 via gravitational attraction.

Herein, the baffles 17 of the flow channel 11 are configured such that a "funnel" shaped structure is formed to prevent filtering media from leaking or falling out of the flow channel 11.

After the filtering media are transferred and parted from the first outlet 112, the filtering media may immediately enter the integrated granular sieving unit 13, in which the sieving unit 13 separates the granular filtering media from the dust by difference in particle sizes therebetween. In the preferred embodiment, the sieving unit 13 can be inclined drums with the addition of strainer type sieving manners to separate the filtering media and dust particles of various sizes based on the inherit difference in weight. As a result, the granular sieving device 13 can control the degree of separation between granular filtering media and dust by altering parameters such as the sieve size, the quantity of sieves, drum rotational speed, or drum inclined angle.

Filtering media leaving the granular sieving unit 13 may be further forwarded via a pneumatic transporting device 16. Herein, the pneumatic transporting device 16 is interconnected to the granular sieving unit 13 and the second inlet 151 of the cyclone separator 15 for the transportation of filtering media to the cyclone separator 15. In the instant embodiment, fine granular filter media are delivered horizontally or vertically via pressurized gas (air in all embodiments) such that gravity is overcome and filtering media can be delivered to a piping end of the pneumatic transporting device 16. Moreover, the cyclone separator 15 draws in the filtering media via air-suction, in which a negative pressure (suction) is generated within the cyclone separator 15 by the vacuum 14 and through the extraction port 153 in order to draw in the filtering media within the other piping end of pneumatic transporting device 16, such that the filtering media are smoothly delivered to the cyclone separator 15.

Filtering media are drawn in through the second inlet 151, subsequently circulated and fallen within the cyclone separator 15. The air which entrains the filtering media is extracted from the extraction port 153 such that downstream piping and equipment are not contaminated by the air entrained with filtering media. The fallen particles of the filtering media are returned to the first inlet 111 of the flow channel 11 through the second outlet 152 and continuously recycled. In the instant embodiment, the extraction port 153 is arranged at the top of the cyclone separator 15 and the second outlet 152 is arranged beneath the second inlet 151. In other words, once the filtering media and entraining air enter the cyclone separator 15, the entraining air may be immediately drawn and exhausted out by the vacuum 14 while the filtering media may drop due to gravity such that air and media are smoothly separated. From FIG. 1A, the air and filtering media are upwardly transported in this embodiment and entering through the second inlet 151 of the cyclone separator 15. Air are drawn out by the vacuum 14 through the piping above the cyclone separator 15 while the filtering media are circulated against the internal surface of the cyclone separator 15 due to centrifugal force and fallen due to gravity. Once the air in the cyclone separator 15 can no longer support the weight of filtering media, the filtering media drop to the bottom of the cyclone separator 15 and depart through the second outlet 152 to complete the separation between air and filtering media.

Hereby, the filtering media in the granular bed filtration system with gas entrained recycling 1 are continuously recycled through the exemplary sequence as follow: the flow channel 11, the granular sieving unit 13, the pneumatic transporting device 16, and the cyclone separator 15. The objective of the flow channel 11 is to filter the flue gas entering from the gas intake 17 such that dust, soot or toxic content leaving the gas exhaust 18 are reduced. The objective of the granular sieving unit 13 is to filter out and remove dust from the granular filtering media and flue gases such that the granular filtering media are fed to the cyclone separator 15 and pneumatic transporting device 16. The cyclone separator 15 and pneumatic transporting device 16 are configured to adapt to the available spacing in the environment such that the horizontal distance or vertical height required to transport the filtering media to the first inlet 111 of the flow channel 11 is overcome. As a result, the granular bed filtration system with gas entrained recycling 1 of the instant disclosure takes into account of cost and filtration efficiency by filtering out dust particle matter from the flue gases while maintaining flue gases at a high temperature high pressure condition.

In order to preserve energy by minimization of power consumption, provide smooth transportation, and overcome horizontal distance or vertical height to provide continuous recycling for the filtering media, the granular bed filtration system with gas entrained recycling 1 is actually designed and maintained with specific sets of operational conditions to obtain the most preferred air transmissive operations. Herein, the granular bed filtration system with gas entrained recycling 1 is defined with an air transmission efficiency, $\eta_p$:

$$\text{Air transmission efficiency } \eta_p = \frac{M_{cyclone}}{M_{total}} \times 100\%;$$

where $M_{total}$ is the total mass of filtering media that enters the pneumatic transporting device 16 per minute and $M_{cyclone}$ is the total mass of filtering media that are collected through the second outlet 152 of the cyclone separator 15. In system design of the instant disclosure, 100% air transmission efficiency, $\eta_p$, is theoretically obtained at the smallest fan speed of the vacuum 14, which means the granular bed filtration system with gas entrained recycling 1 is relatively energy saving, to provide smooth transportation of the granular filtering media to the cyclone separator 15. As a result, filtering media are not accumulated within piping, which can lead to unnecessary energy consumption.

The instant disclosure includes an experiment using a 1.5 inch diameter piping to determine the effect on air transmission efficiency, $\eta_p$, with respect to the relationship between the wind speed of the vacuum 14 and the mass flowrate of filtering media (simply known as mass flowrate) in the cyclone separator 15. As illustrated by the experimental results in FIG. 5, when the vacuum 14 is at wind speed of 5.18 m/s, the air transmission efficiency is 0; at wind speed of 6.14 m/s, the air transmission efficiency is about 40 to 70%. When the vacuum 14 is at a wind speed of 6.51 m/s, the air transmission efficiency shows signs of reduction only at a relatively large mass flowrate; at wind speed of 7.14 m/s, the air transmission efficiency is essentially 100%.

Figure 5:
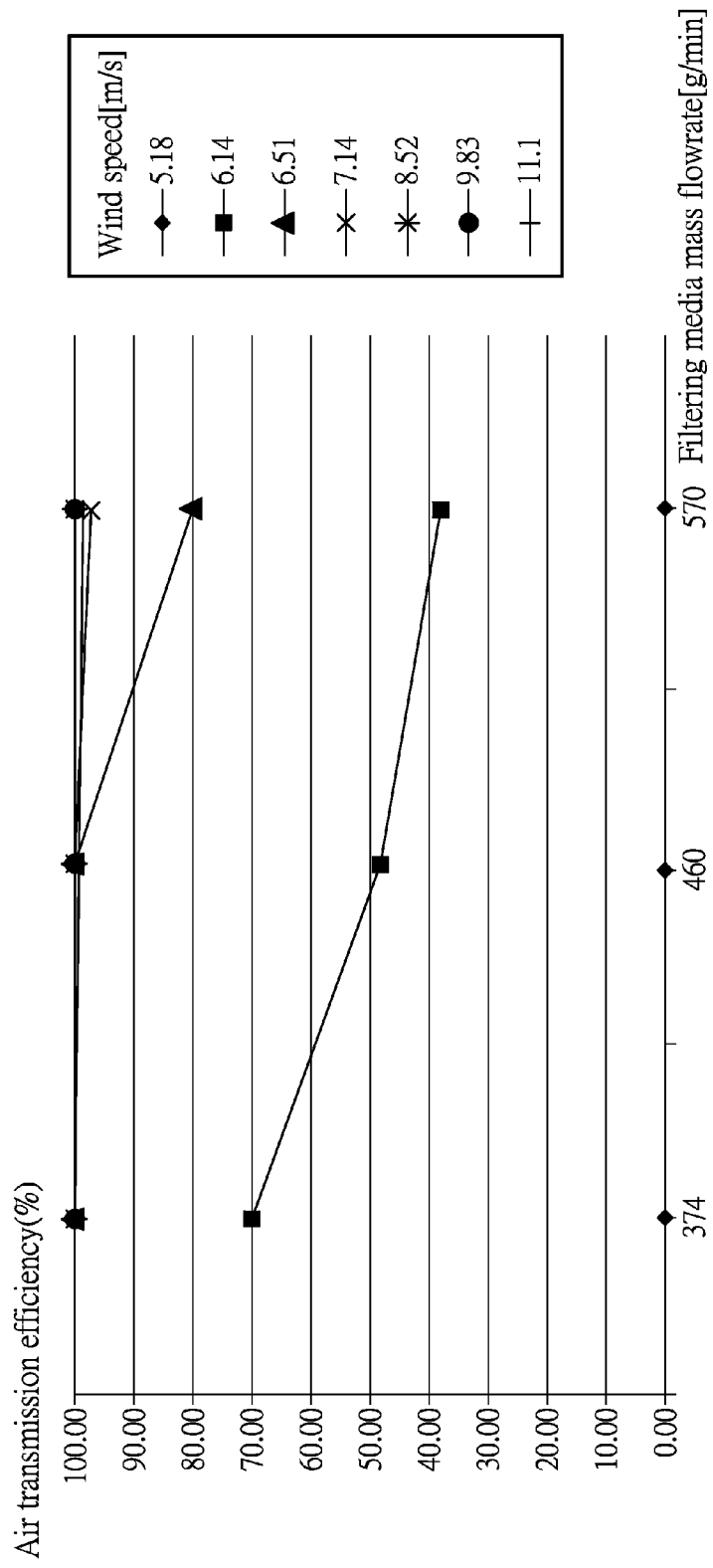

Referring to FIG. 5, as the wind speed of the vacuum 14 increases, the air transmissible mass of the filtering media also increases. At the wind speed of 6.14 m/s and a mass flowrate of 374 g/min, the filtering media are not completely transported towards the upper portion of the cyclone separator 15. Not until the vacuum 14 wind speed is larger than 6.51 m/s, will the air transmission efficiency, $\eta_p$, rise above 80%. Moreover, as the mass flowrate increases, the air transmission efficiency, $\eta_p$, decreases. As a result, increasing mass flowrate of the filtering media by the pneumatic transporting device 16 is not a direct result that leads to an increase in the amount of filtering media transported to the cyclone separator 15. On the other hand, air within the piping may not be able to smoothly transport the filtering media into the cyclone separator 15 due to the excessive amount of filtering media simultaneous flowing therethrough, and therefore, a decline in air transmission efficiency, $\eta_p$, occurs.

Please refer to FIG. 6. At a fix mass flowrate of the filtering media with each feedrate and mass flowrate, the air transmission efficiency, $\eta_p$, rises as the wind speed increases. As illustrated in FIG. 6, in order to reach 100% air transmission efficiency, mass flowrates of 374 g/min, 460 g/min, and 570 g/min require wind speed of about 6 m/s, 6.14 m/s, and 8.52 m/s, respectively.

Regardless of the size of filtering media piping in the granular bed filtration system with gas entrained recycling 1, the wind speed of the vacuum 14 or the mass flow rate of the filtering media provided by the pneumatic transporting device 16 can be adjusted as needed such that the system may have essentially 100% air transmission efficiency, $\eta_p$, at minimal energy consumption, thus rendering the system convenient and practical.

Second Embodiment

Figure 1B:
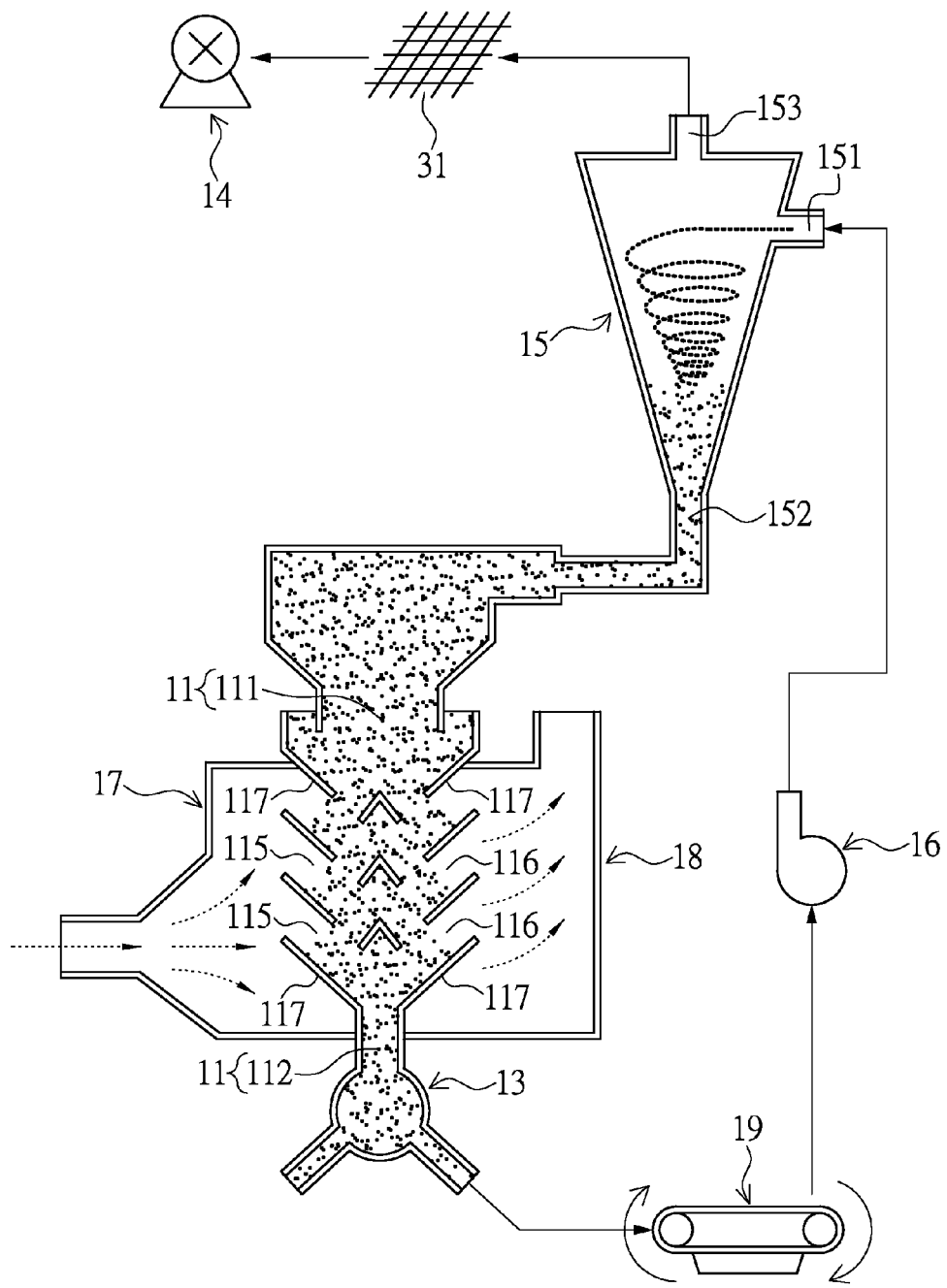
FIG. 1B is a schematic diagram illustrating the granular bed filtration system with gas entrained recycling according to a second embodiment of the instant disclosure.

Referring to FIG. 1B as the schematic diagram illustrating the second embodiment of the instant disclosure. In comparison with the first embodiment, the granular bed filtration system with gas entrained recycling 1 may further include a filtering media transporting device 19 arranged between the granular sieving unit 13 and the pneumatic transporting device 16 such that the filtering media transporting device 19 can transport filtering media therebetween. In the instant embodiment, the filtering media transporting device 19 can be a conveyor belt or other transporting devices for solid matters. By using the filtering media transporting device 19, filtering media sieved by the granular sieving unit 13 can be transported to remote enclosures or locations in order to overcome geographical limitations.

Third Embodiment

Figure 2A:
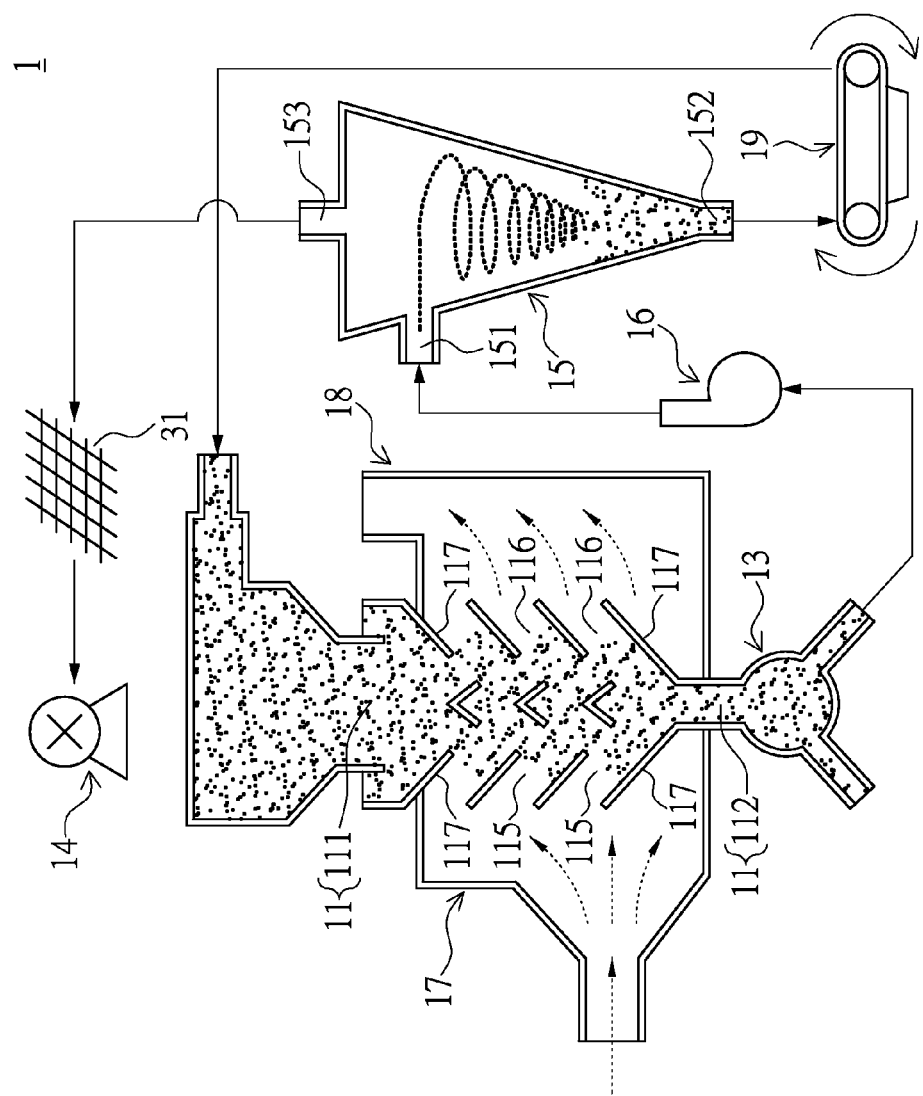
FIG. 2A is a schematic diagram illustrating the granular bed filtration system with gas entrained recycling according to a third embodiment of the instant disclosure.

Please refer to FIG. 2A as the schematic diagram illustrating the third embodiment of the instant disclosure. The granular bed filtration system with gas entrained recycling 1 also includes a filter media transporting device 19. The transporting device is arranged between the second outlet 152 of the cyclone separator 15 and the first inlet 111 of the flow channel 11 such that filtering media discharged by cyclone separator 15 are transported to the first inlet 111 and subsequently into the flow channel 11. In such manner, the flow channel 11, granular sieving unit 13, and the pneumatic transporting device 16 may be configured in close proximity (such as in the same plant or enclosure) in order to facilitate filtering media discharged from the cyclone separator 15 to be transported through other plants or enclosures via the filter media transporting device 19. Subsequently, the filtering media may be further filtered or processed to increase utility of the granular bed filtration system with gas entrained recycling 1.

Fourth Embodiment

Figure 2B:
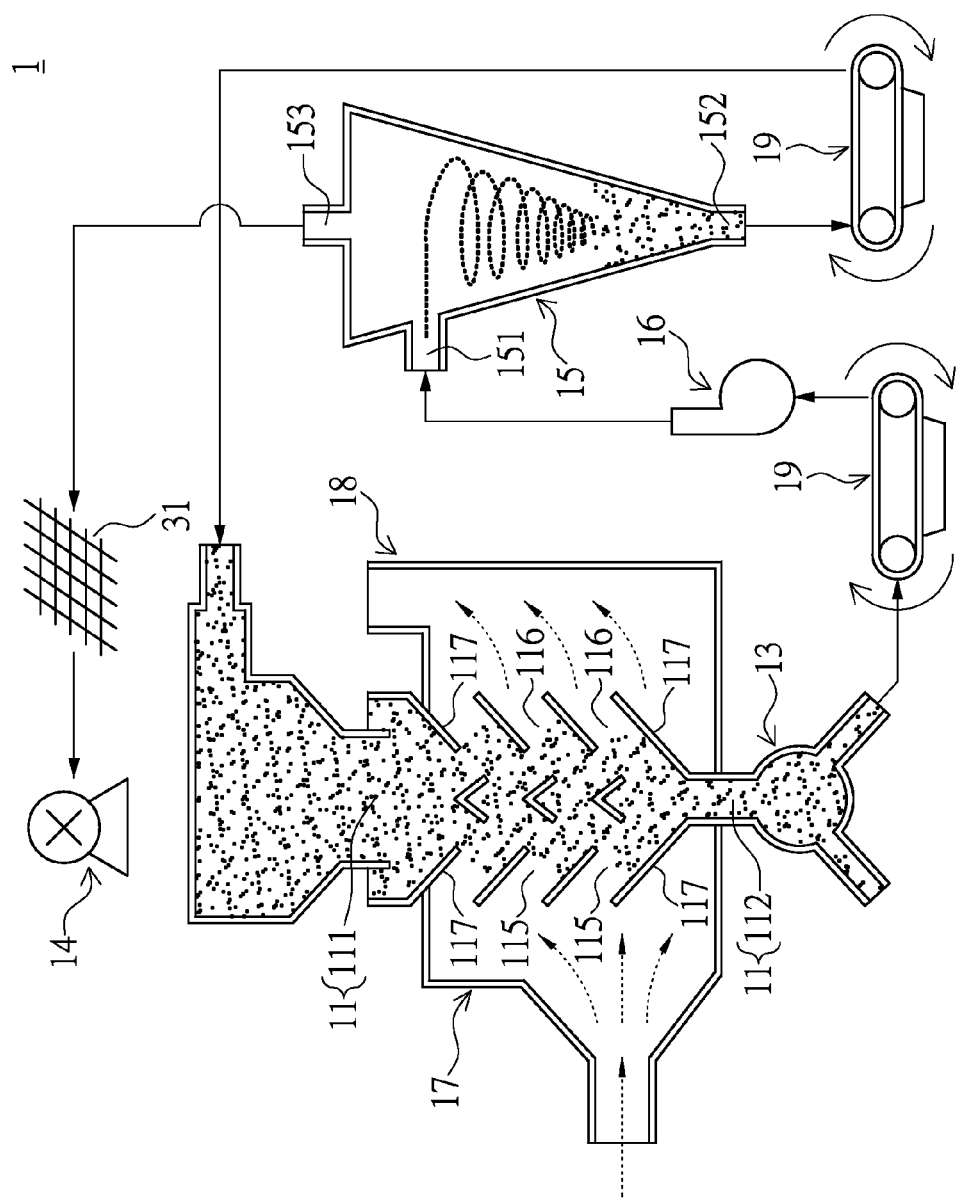
FIG. 2B is a schematic diagram illustrating the granular bed filtration system with gas entrained recycling according to a fourth embodiment of the instant disclosure.

Referring to FIG. 2B is the schematic diagram illustrating the fourth embodiment of the instant disclosure. In comparison with the third embodiment in FIG. 2A, the granular bed filtration system with gas entrained recycling 1 in the instant embodiment is configured with two filter media transporting devices 19, in which one of the filter media transporting devices 19 is arranged between the granular sieving unit 13 and the pneumatic transporting device 16 while the other filter media transporting device 19 is arranged between the second outlet 152 of the cyclone separator 15 and the first inlet 111 of the flow channel 11. With the aforementioned configuration, the granular bed filtration system with gas entrained recycling 1 in the instant embodiment is applicable in a wide range of occasions and practical situations in factories.

Fifth Embodiment

Figure 3:
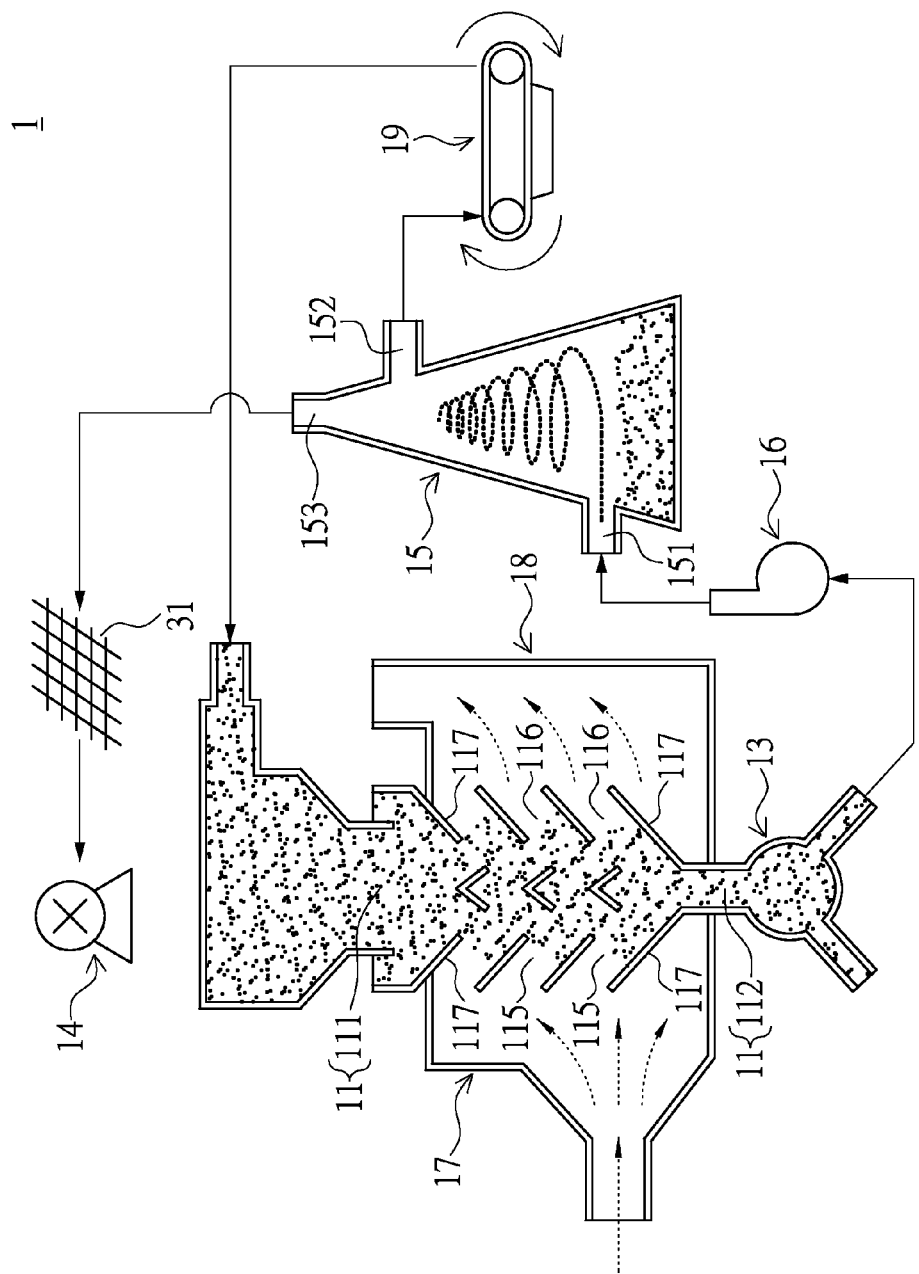
FIG. 3 is a schematic diagram illustrating the granular bed filtration system with gas entrained recycling according to a fifth embodiment of the instant disclosure.

Please refer to FIG. 3 as the schematic diagram illustrating the fifth embodiment of the instant disclosure. The cyclone separator 15 of the granular bed filtration system with gas entrained recycling 1 adopts an invert-mounting structural design such that the second inlet 151 is arranged below the second outlet 152. In the instant embodiment, the upwardly discharged air flow is applied to discharge filtering media from the second outlet 152.

Sixth Embodiment

Figure 4:
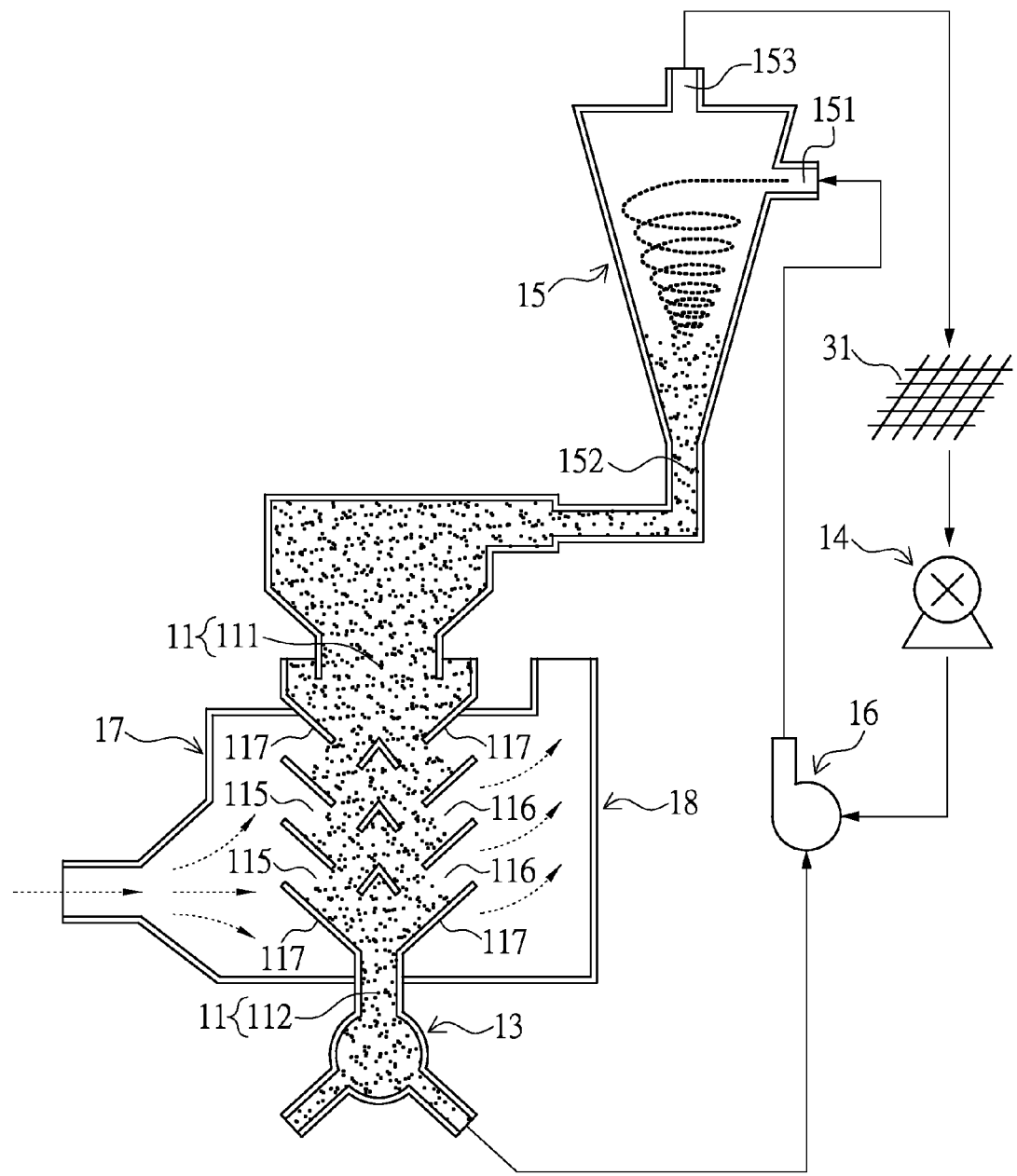
FIG. 4 is a schematic diagram illustrating the granular bed filtration system with gas entrained recycling according to a sixth embodiment of the instant disclosure.

Please refer to FIG. 4 as the schematic diagram illustrating the fifth embodiment of the instant disclosure. The pneumatic transporting device 16 transports the filtering media from the granular sieving unit 13 to the second inlet 151 of the cyclone separator 15 via gas entrainment. In this embodiment, the pneumatic transporting device 16 provided gas (air in this embodiment) into piping between the granular sieving unit 13 and the cyclone separator 15 such that the filtering media are entrained in air and transported. Thereafter, the filtering media entrained in air, which may possibly contain dust particles or toxic gases, are forwarded to the cyclone separator 15 for separation. Subsequently, the filtering media entrained air is forwarded to the vacuum 14 for discharging into the environment, which is a safety concern for the environment and the community. As a result, the granular bed filtration system with gas entrained recycling 1 of the instant embodiment further redirects the media entrained air discharged from the vacuum 14 to the pneumatic transporting device 16, through which the media entrained air re-enters the second inlet 151 and the cyclone separator 15. Therefore, the vacuum 14, cyclone separator 15, and the pneumatic transporting device 16 form a sealed recycling route which prevents the discharging of toxic gases that may cause environmental concerns.

In summary, the granular bed filtration system with gas entrained recycling 1 of the instant disclosure can consistently provide recyclable and essentially automated filter system that separates granular filtering media from flue gas dust within the flue gases of thermal power plants and prevents piping blockage under high temperature, high pressure conditions. Also, by controlling the parameters of the gas entrained recycling provided by the instant disclosure, gas (air) transmission efficiency may sustain at about 100% for a substantial period of time. The wind speed of the vacuum 14 and the filtering media mass flowrate parameters can be adjusted as desired to control the dust filtering efficiency or sieving efficiency of the system while providing energy saving (at minimum wind speed suctioning), practicality, and substantial utility potential.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A granular bed filtration system having gas entrained recycling for filtering contaminants from gases via a filtering medium, comprising:

a flow channel including a first inlet, a first outlet, at least one gas inlet, and at least one gas outlet, the gas inlet and outlet respectively arranged on opposing sides of the flow channel;

a gas intake correspondingly arranged proximate to a side of the gas inlet for guiding unfiltered gases thereto;

a gas exhaust correspondingly arranged proximate to a side of the gas outlet for guiding filtered gases to depart therefrom;

a granular sieving unit interconnected to the first outlet;

a vacuum;

a cyclone separator including a second inlet, a second outlet, and an extraction port, the second inlet and outlet arranged beneath the extraction port, the vacuum interconnected to the extraction port, the second outlet interconnected to the first inlet; and a pneumatic transporting device interconnected to the granular sieving unit and the second inlet for transporting the filtering medium to the cyclone separator;

the vacuum interconnected to the extraction port and the pneumatic transporting device, a filtration unit arranged between the vacuum and the extraction port;

wherein the filtering medium is continuously recycled in the granular bed filtration system with gas entrained recycling;

wherein the pneumatic transporting device transports a media entrained air from the granular sieving unit to the cyclone separator, and the media entrained air discharged from the extraction port of the cyclone separator is filtered by the filtration unit and redirected to the pneumatic transporting device by the vacuum, so as to transfer the media entrained air back to the cyclone separator again.

2. The system as recited in claim 1, wherein the gas intake is sealed to the periphery of the gas inlet and the gas exhaust is sealed to the periphery of the gas outlet.

3. The system as recited in claim 1, wherein the extraction port is arranged on the top of the cyclone separator.

4. The system as recited in claim 1, wherein the second outlet is arranged beneath the second inlet.

5. The system as recited in claim 1, wherein the first inlet is arranged above the first outlet.

6. The system as recited in claim 1, wherein the cyclone separator is arranged above the first inlet.

7. The system as recited in claim 1 further comprising a filtering media transporting device arranged between the second outlet and the first inlet and the filtering media transporting device transporting the filtering medium to the first inlet.

8. The system as recited in claim 1 further comprising a filtration unit arranged between the vacuum and the extraction port.

9. The system as recited in claim 1, wherein the vacuum has a wind speed no less than 6.51 m/s.

10. The system as recited in claim 1 further comprising a filtering media transporting device arranged between the granular sieving unit and the pneumatic transporting device.

* * * * *